US010645235B1

(12) United States Patent
Sabandith

(10) Patent No.: US 10,645,235 B1
(45) Date of Patent: May 5, 2020

(54) SYSTEM AND METHOD FOR BLOCKCHAIN LEDGER OVER MULTIFUNCTION PERIPHERAL NETWORK

(71) Applicant: Toshiba TEC Kabushiki Kaisha, Shinagawa-ku (JP)

(72) Inventor: Milong Sabandith, Irvine, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/170,805

(22) Filed: Oct. 25, 2018

(51) Int. Cl.
*H04N 1/00* (2006.01)
*H04L 29/06* (2006.01)
*G06Q 20/38* (2012.01)
*G06Q 10/08* (2012.01)

(52) U.S. Cl.
CPC ....... *H04N 1/00206* (2013.01); *G06Q 10/087* (2013.01); *G06Q 20/389* (2013.01); *H04L 63/123* (2013.01)

(58) Field of Classification Search
None
See application file for complete search history.

(56) References Cited

U.S. PATENT DOCUMENTS

| | | | |
|---|---|---|---|
| 9,922,278 B2 | 3/2018 | Kapinos et al. | |
| 10,367,796 B2* | 7/2019 | Blake | H04L 63/10 |
| 2016/0012465 A1 | 1/2016 | Sharp | |
| 2017/0237570 A1* | 8/2017 | Vandervort | H04L 63/0442 713/176 |
| 2018/0060836 A1 | 3/2018 | Castagna | |
| 2018/0285971 A1* | 10/2018 | Rosenoer | G06N 20/00 |
| 2018/0342171 A1* | 11/2018 | Darnell | G06Q 20/065 |
| 2019/0253434 A1* | 8/2019 | Biyani | H04L 63/126 |

* cited by examiner

*Primary Examiner* — Thomas D Lee
(74) *Attorney, Agent, or Firm* — Ulmer & Berne LLP

(57) ABSTRACT

A system and method for distributed multifunction peripheral blockchain ledgering includes a group of networked MFPs, each having a document processing engine, a network interface and an intelligent controller with a processor and memory. An electronic blockchain ledger is stored in memory, along with licensing data designating the multifunction peripheral as trusted. Transaction data is received via the network interface and validated. MFPs poll other trusted, networked multifunction peripherals to validate received transaction data, and update the blockchain ledger in accordance with validated transactions.

20 Claims, 6 Drawing Sheets

SYSTEM AND METHOD FOR BLOCKCHAIN LEDGER OVER MULTIFUNCTION PERIPHERAL NETWORK

TECHNICAL FIELD

This application relates generally to an enterprise electronic blockchain ledger system. The application relates more particularly to leveraging processing power of an array of networked multifunction peripherals to provide an enterprise with a blockchain ledger.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs have evolved to be sophisticated business machines requiring an on board computer, referred to as a controller. A controller monitors device operation, controls operations of document processing engines which govern printing, faxing, scanning, emailing, storing or networking operations.

Given the expense in obtaining and maintain MFPs, two or more devices are frequently shared or monitored by users via a data network. Many document processing operations may require a fee. All operations are associated with costs. All document operations require operational time of a device that can be expensive. MFPs further possesses a finite lifetime with regular device maintenance costs. All device operations require consumption electric power. While some operations, like faxing, emailing or scanning, do have costs associated with them, they are relatively small as compared to printing. Printing operations require mechanical interactions that place wear and tear on paper drive mechanisms. Printing operations also require consumption media, such as paper, and deposition components, such as ink or toner. Color printing can be even more expensive as it requires formation of colors by consumption of multiple colors of toner or ink.

For the reasons noted above, many MFPs are subject to a use charge. Operations such as scanning, emailing or faxing may be offered at low or no cost. The more expensive printing or copying may be subject to a fee, such as per-page fee. Color printing or copying may be subject to a higher charge. Costs may be assessed to a particular person or group. Also, quotas may also be set. Accurate tracking of device usage is therefore desirable, not only for cost purposes, but also to track device usage or maintenance needs.

In office environments, it is important to maintain accurate information, not only for MFP related information, but also for information such as inventory levels, medical information or financial information. Certain information, such as medical records or financial information, can be highly confidential and subject to access control or tracking.

BRIEF DESCRIPTION OF THE DRAWINGS

Various embodiments will become better understood with regard to the following description, appended claims and accompanying drawings wherein:

DETAILED DESCRIPTION

Figure 1:
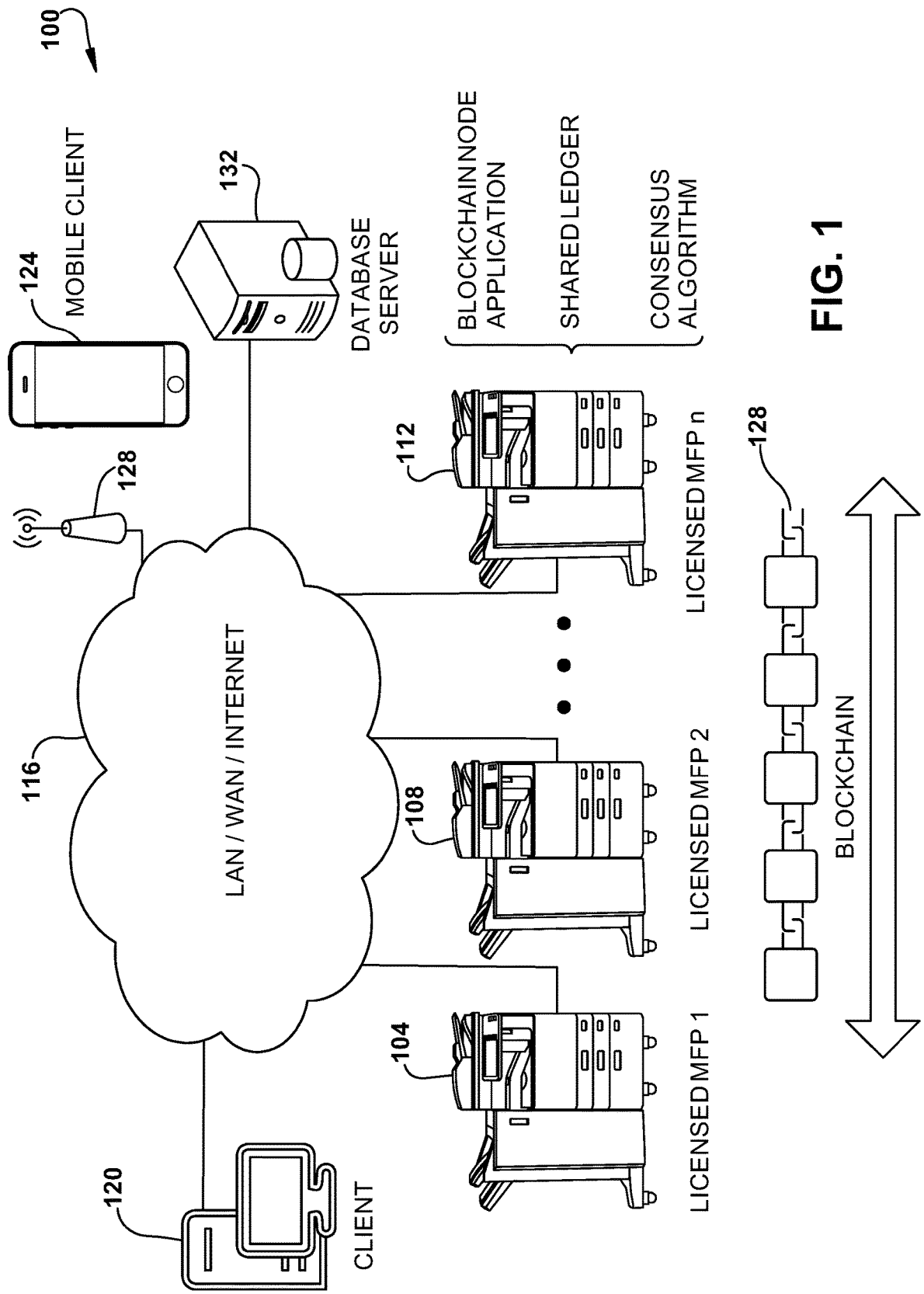
FIG. 1 is an example embodiment of an MFP-based blockchain ledger system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with an example embodiment, detailed below, a system and method for distributed multifunction peripheral blockchain ledgering includes a group of networked MFPs, each having a document processing engine, a network interface and an intelligent controller with a processor and memory. An electronic blockchain ledger is stored in memory, along with licensing data designating the multifunction peripheral as trusted. Transaction data is received via the network interface and validated. MFPs poll other trusted, networked multifunction peripherals to validate received transaction data, and update the blockchain ledger in accordance with validated transactions.

Information, such as inventory, medical records, financial information, may be stored in a database, such as may be provided by a networked database server. A history of transactions, such as inventory changes or financial dealings, may be stored in what may be referred to as an electronic ledger. An electronic ledger may reside on a networked server. Electronic ledgers may suffer from lack of verification of input information. Electronic ledgers may also suffer from lack of security. Example embodiments disclosed herein accomplish electronic ledgers in the form of a cryptographically linked list of records, or blocks, referred to as a blockchain.

Blockchain is attributed to a development in 2008 by Satoshi Nakamoto and forms the basic structure for virtual currency referred to as Bitcoin. Each block contains a cryptographic hash of the previous block, a timestamp, and transaction data (generally represented as a Merkle tree root hash). By design, a blockchain is resistant to modification of the data. It is "a distributed ledger that can record transactions efficiently and in a verifiable and permanent way." For use as a distributed ledger, a blockchain is suitably managed by a peer-to-peer network collectively adhering to a protocol for inter-node communication and validating new blocks. Once recorded, data in any given block cannot be altered retroactively without alteration of all subsequent blocks which requires consensus of the network majority.

Since blockchains require multiple nodes, a corresponding number of networked computers must be made available. A public blockchain, such as with Bitcoin, has the benefit of many available computers with which to function. Any private blockchain ledger system would also require purchasing, configuring, networking and operation of multiple computer systems. This can add substantial expense, not only in hardware costs, but also with increase energy use and space requirements. Example embodiments disclosed herein facilitate a private blockchain ledger system that leverages infrastructure found in groups of networked MFPs. MFP-based blockchain ledgers are suitably used in connection with secure, accurate tracking of transactions, including financial, inventory or medical transactions. MFP-based blockchain ledgers are also suitable for accurate tracking of MFP device usage, consumable usage, maintenance information, and the like.

In accordance with the subject application, FIG. 1 illustrates an example embodiment of an MFP-based blockchain ledger system 100. Two or more MFPs, illustrated by MFPs 104, 108 and 112, are in data communication with one another via network 116. MFPs are suitably licensed in advanced as being trusted nodes on a blockchain system. Read/Write permissions may be limited to trusted MFP nodes to enhance security. Network 116 is suitably comprised of a local area network (LAN), wide area network (WAN) which may comprise the Internet, or any suitable combination thereof. Network 116 is suitably comprised of any wireless or wired network, or any suitable combination thereof. While any network may be suitable, it may be advantageous to limit communication to a secure network to keep data more secure. System 100 suitably includes non-MFP clients, such as client workstation 120 and mobile client 124, suitably a smartphone or tablet computer communicating with network 116 via cell tower or Wi-Fi hot spot 128. Blockchain 128, along with a blockchain node application, shared ledger and consensus algorithm, is maintained by a plurality of MFPs, such as MFP 104, 108 and 112, as will described in further detail below. A blockchain ledger suitably distributed to all MFPs, but may also reside in another networked digital device such as database server 132.

Figure 2:
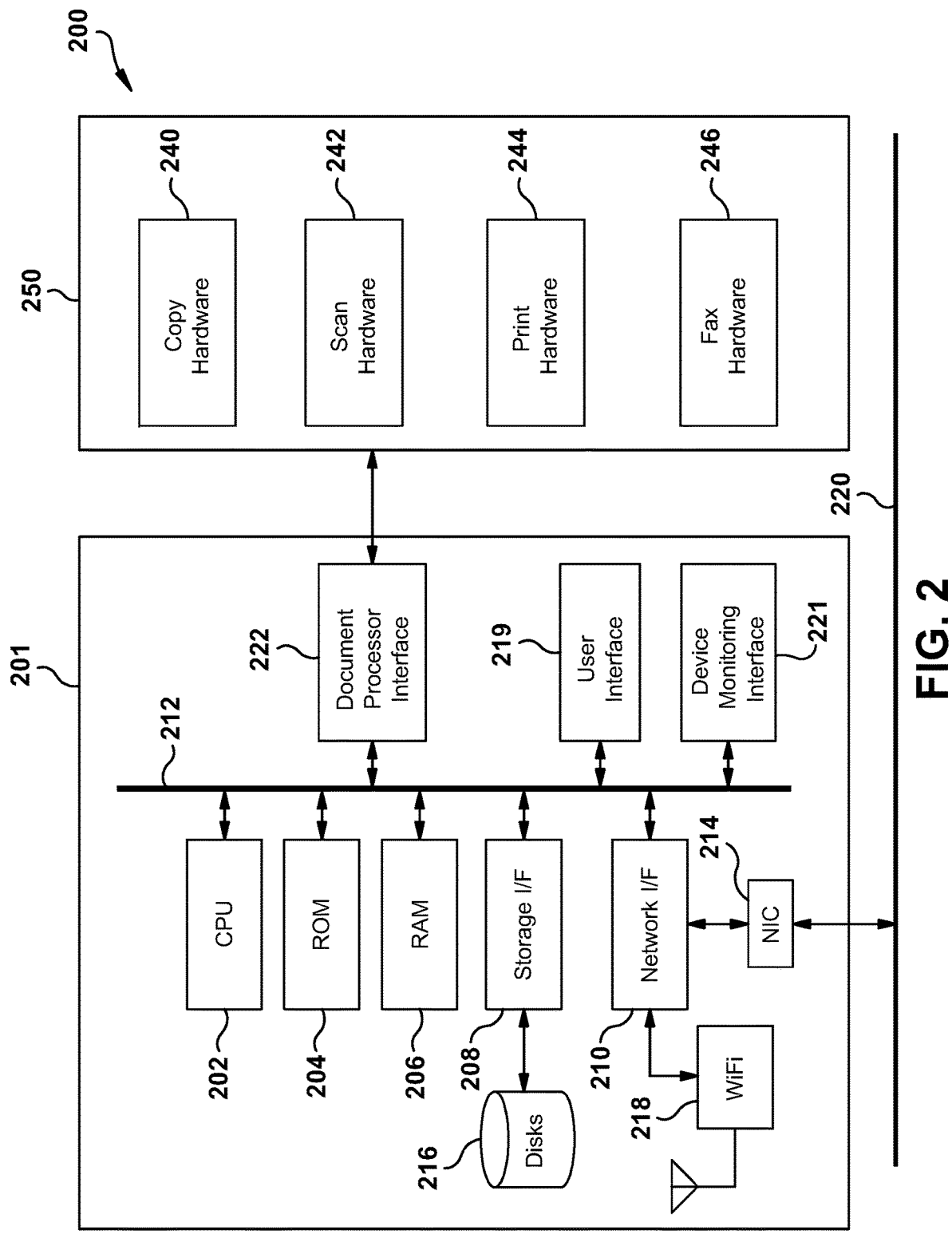
FIG. 2 is an example embodiment of a document rendering system.

Turning now to FIG. 2 illustrated is an example embodiment of a MFP device comprised of a document rendering system 200 suitably comprised within an MFP, such as with MFPs 104, 108 and 112 of FIG. 1. Included in intelligent controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with a user interface 219 and a device monitoring interface 221, suitably in contact with one or more sensors which provide data relative to a state of the device or associated surroundings, such as device temperature, ambient temperature, humidity, device movement, ink levels, toner levels, paper levels and the like.

Processor 202 can also be in data communication with any suitable user input/output (I/O) interface which provides data communication with user peripherals, such as displays, keyboards, mice, track balls, touch screens, or the like. Hardware monitors suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Intelligent controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
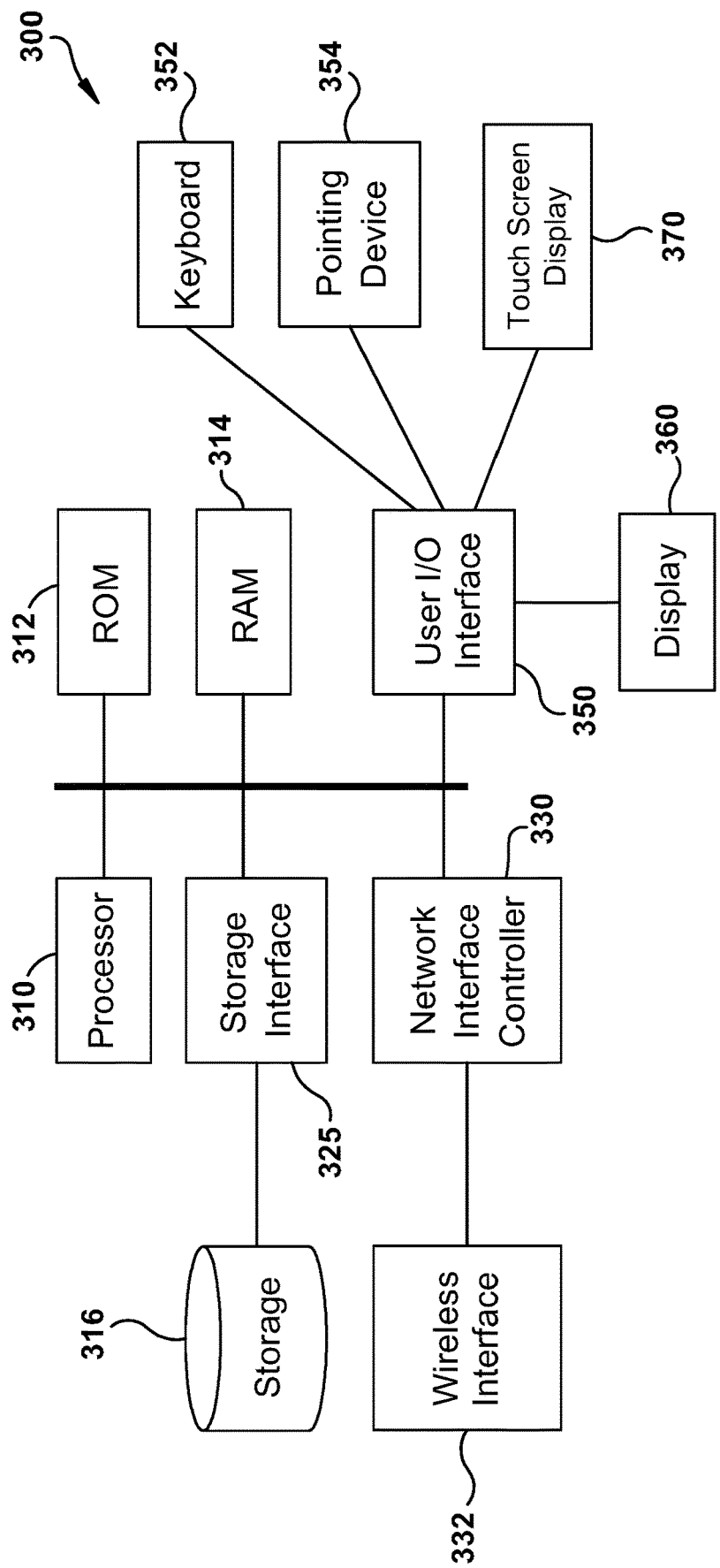
FIG. 3 is an example embodiment of a digital device.

Turning now to FIG. 3, illustrated is an example embodiment of components of a suitable digital device 300 such as client 120, mobile client 124 or server 132 of FIG. 1. Included are one or more processors, such as that illustrated by processor 310. Each processor is suitably associated with non-volatile memory, such as read only memory (ROM) 312 and random access memory (RAM) 314, via a data bus.

Processor 310 is also in data communication with a storage interface 325 for reading or writing to a data storage system 316, suitably comprised of a hard disk, optical disk, solid-state disk, or any other suitable data storage as will be appreciated by one of ordinary skill in the art.

Processor 310 is also in data communication with a network interface controller (NIC) 330, which provides a data path to any suitable wired or physical network connection via a physical network interface, or to any suitable wireless data connection via wireless interface 332, such as one or more of the networks detailed above. The system suitably uses location-based services. Processor 304 is also in data communication with a user input/output (I/O) interface 350 which provides data communication with user peripherals, such as display 360, as well as keyboards 352, mice, track balls, or other pointing devices 354, touch screen 370, or the like. It will be understood that functional units are suitably comprised of intelligent units, including any suitable hardware or software platform.

Figure 4:
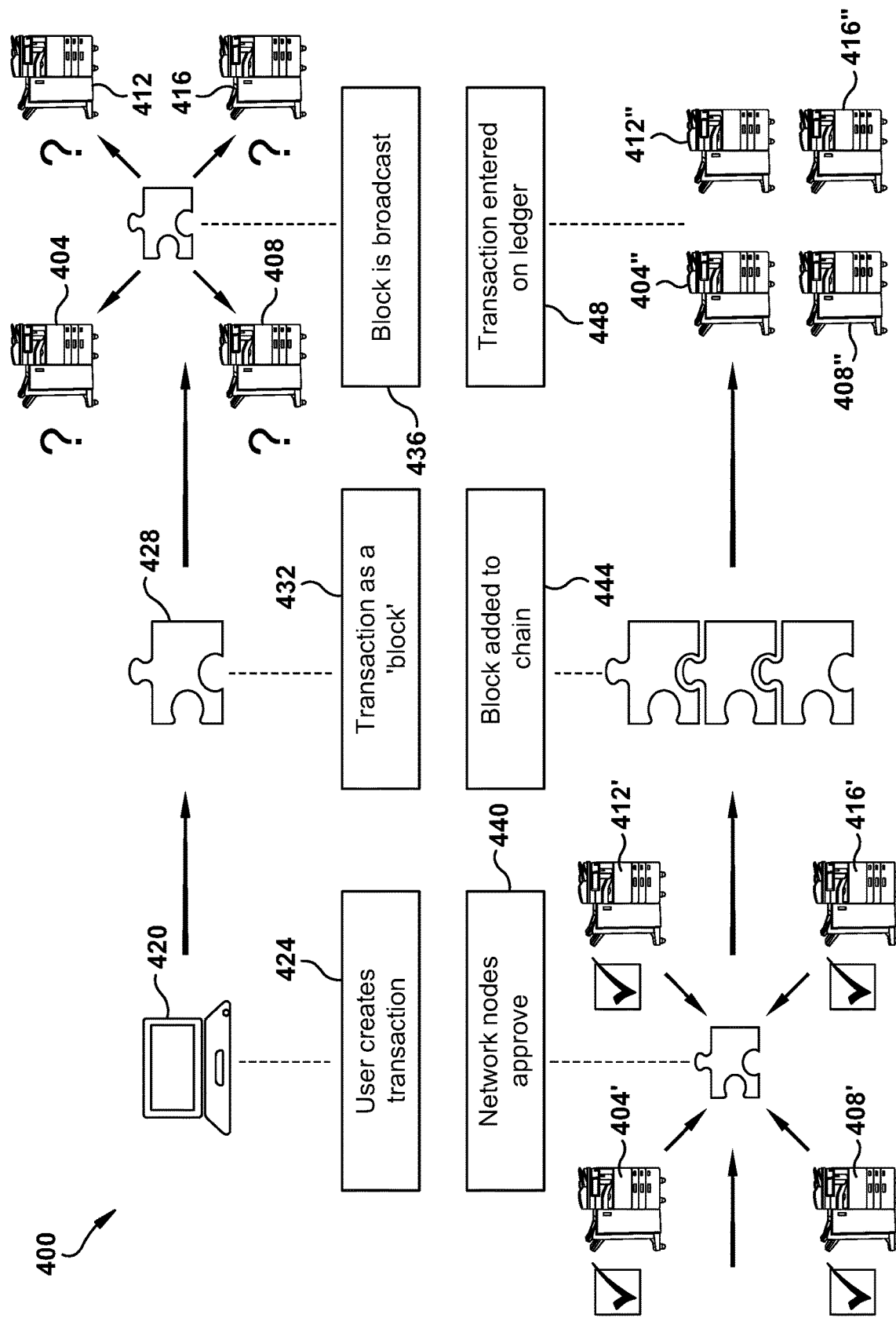
FIG. 4 is an example embodiment of an MFP-based blockchain ledger system.

FIG. 4 illustrates an example embodiment of an MFP-based blockchain ledger system 400 employing MFPs 404, 408, 412 and 416. In the illustrated example, a user (or automated data entry) provides transactional input from digital device 420, suitably a client computer. A transaction is created at step 424 and a new block 428 is created at step 432. Next, the new block is broadcast at step 436 to MFPs 404, 408, 412 and 416. MFPs check the block and approve at MFPs 404', 408', 412' and 416', providing network approval at step 440. Approval may be by one or more devices. More devices that approve provide better security and reliability. Any suitable level of approval may be selected, such as two devices, a majority of devices or unanimous consensus. Fewer devices may be required for secure networks or when licensed, secure devices are used. Once a block is approved at step 440, the new block 428 is added to the blockchain at step 444. The updated blockchain provides an update transaction ledger at block 448, which ledger is suitably housed on one or more MFPs 404", 408", 412" and 416".

Figure 5:
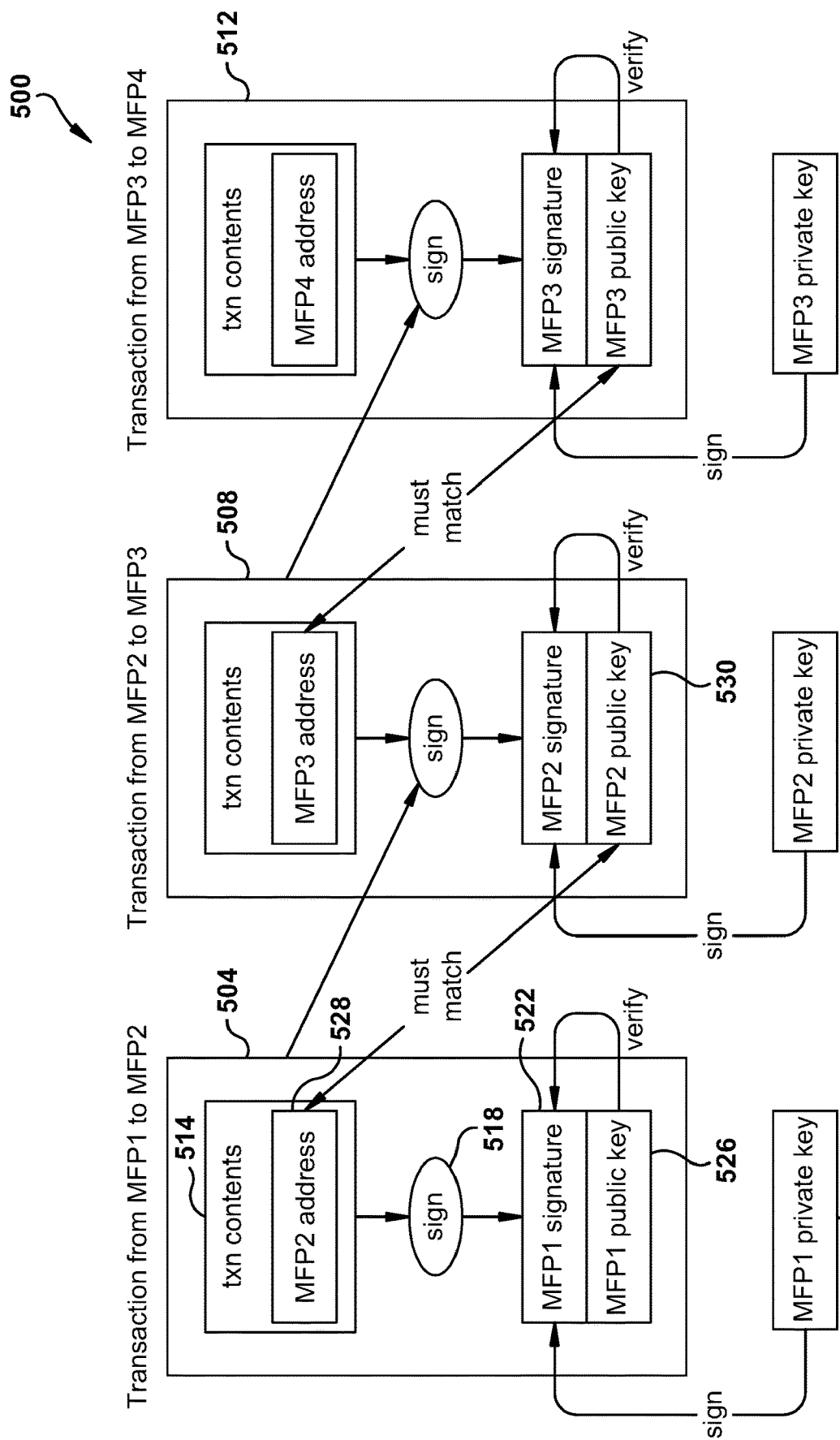
FIG. 5 is an example embodiment of transaction of a blockchain ledger system.

FIG. 5 illustrates an example embodiment of a blockchain transaction ledger system 500, illustrated as a sequence of verifications 504, 508 and 512 as accomplished between MFP1, MFP2, MFP3, and MFP4. As illustrated by block 504, as a transaction moves from MFP1 to MFP2, transaction contents 514 at MFP1 are signed at 518 in conjunction with MFP1's signature 522, public key 526 and private key 530. Transaction content is checked in accordance with MFP2's address 528 and public key 530 which must match. Analogous processes are completed by the sequence of MFPs at block 508 and 512.

Figure 6:
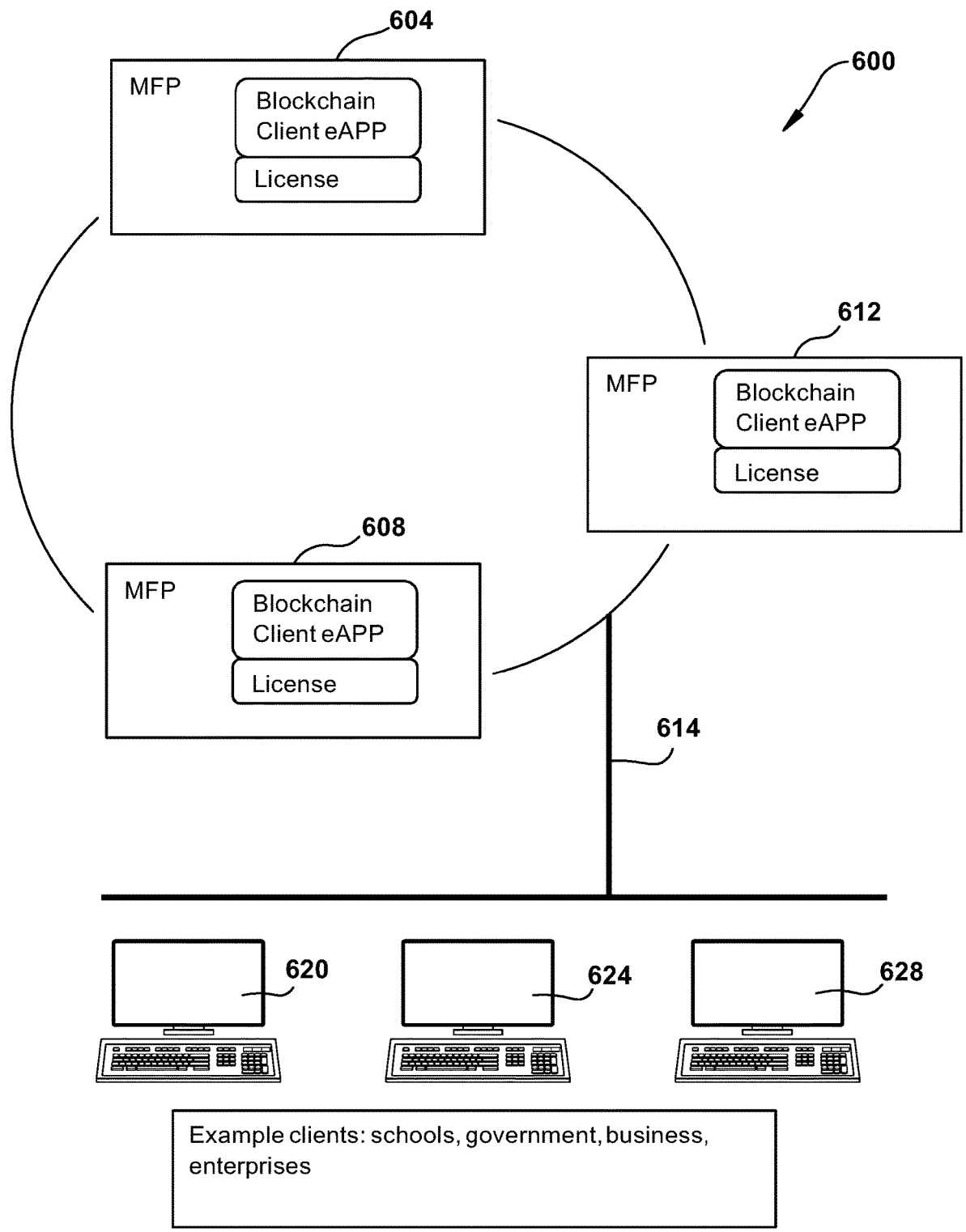
FIG. 6 is an example embodiment of a blockchain ledger system.

FIG. 6 illustrates an example embodiment of a MFP-based blockchain ledger system 600 employing MFPs 604, 608 and 612 in mutual data communication via network 614. Each MFP 604, 608, 612 is provided with a blockchain eAPP and license as a trusted device. Example clients, such as schools, governments business or enterprises communicate with the MFPs via network 614 via client devices such as clients 620, 624 and 628. The MFP-based blockchain ledger system 600 is suitably, by way of example, provided within a premises or network, or offered as a service to third parties.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising a plurality of networked multifunction peripherals, each multifunction peripheral including:
    a document processing engine;
    a network interface; and
    an intelligent controller comprised of a processor and associated memory,
        the memory including an electronic blockchain ledger,
        the memory further including licensing data designating the multifunction peripheral as trusted,
        the processor configured to receive transaction data via the network interface,
        the processor further configured to validate received transaction data,
        the processor further configured to poll other trusted networked multifunction peripherals to validate received transaction data, and
        the processor further configured to update the electronic blockchain ledger in accordance with transaction data validated by a plurality of the trusted networked multifunction peripherals.

2. The system of claim 1 wherein the networked multifunction peripherals are configured to share data via a private network.

3. The system of claim 2 wherein each trusted networked multifunction peripheral is configured with read/write permission relative to the electronic blockchain ledger.

4. The system of claim 1 wherein the electronic blockchain ledger is comprised of a product inventory and wherein the processor is further configured to receive transaction data comprised of an inventory change.

5. The system of claim 1 wherein the electronic blockchain ledger is comprised of a financial ledger and wherein the processor is further configured to receive transaction data comprised of a financial transaction.

6. The system of claim 1 wherein the processor is further configured to update the electronic blockchain ledger in accordance with transaction data validated by a majority of the trusted networked multifunction peripherals.

7. The system of claim 1 wherein the processor is further configured to update the electronic blockchain ledger in accordance with transaction data validated by each of the trusted networked multifunction peripherals.

8. The system of claim 1 further comprising at least one untrusted electronic data device that stores the electronic blockchain ledger.

9. The system of claim 8 wherein the at least one untrusted electronic data device is comprised of a network database server.

10. A method comprising:
    storing a copy of an electronic blockchain ledger in a memory of each of a plurality of networked multifunction peripherals;
    storing licensing data designating at least two of the networked multifunction peripherals as trusted;
    receiving transaction data into each trusted networked multifunction peripheral via an associated network interface;
    validating received transaction data in the at least two trusted networked multifunction peripherals;
    polling, by each of the trusted networked multifunction peripherals, at least one other trusted networked multifunction peripheral to validate received transaction data, and
    updating the electronic blockchain ledger in accordance with transaction data validated by a plurality of the trusted networked multifunction peripherals.

11. The method of claim 10 further comprising communicating data among the networked multifunction peripherals via a private network.

12. The method of claim 10 further comprising assigning blockchain read/write privileges to the trusted networked multifunction peripherals.

13. The method of claim 10 wherein the blockchain ledger is comprised of a product inventory and further comprising receiving the transaction data comprised of an inventory change.

14. The method of claim 10 wherein the blockchain ledger is comprised of a financial ledger and further comprising receiving the transaction data comprised of a financial transaction.

15. The method of claim 10 further comprising updating the electronic blockchain ledger in accordance with transaction data validated by a majority of the trusted networked multifunction peripherals.

16. The method of claim 10 further comprising updating the electronic blockchain ledger in accordance with transaction data validated by each of the trusted networked multifunction peripherals.

17. The method of claim 10 further comprising storing the electronic blockchain ledger on at least one untrusted networked electronic data device.

18. The method of claim 17 wherein the at least one untrusted networked data device is comprised of a network database server.

19. A distributed electronic ledger system comprising:
a plurality of multifunction peripherals in network data communication,
wherein each multifunction peripheral includes
an intelligent controller including a processor and associated memory running a common blockchain node application and consensus algorithm,
a blockchain ledger stored in the memory,
a document processing engine, and
a monitor configured to monitor operation of the document processing engine,
wherein each intelligent controller is configured to receive transaction input corresponding to monitored operations of each of the multifunction peripherals,
wherein a plurality of intelligent controllers are configured to verify received transaction input,
wherein each intelligent controller is further configured to update the blockchain ledger in accordance with monitored operations, and
wherein a plurality of intelligent controllers are configured to verify an updated blockchain ledger.

20. The system of claim 19 wherein the transaction input includes data corresponding to document processing operations completed via the document processing engine.

* * * * *